Jan. 26, 1960  R. A. NORBOM  2,922,537
DEMOUNTABLE RAILWAY CONTAINER TRANSFER APPARATUS
Filed Dec. 5, 1958
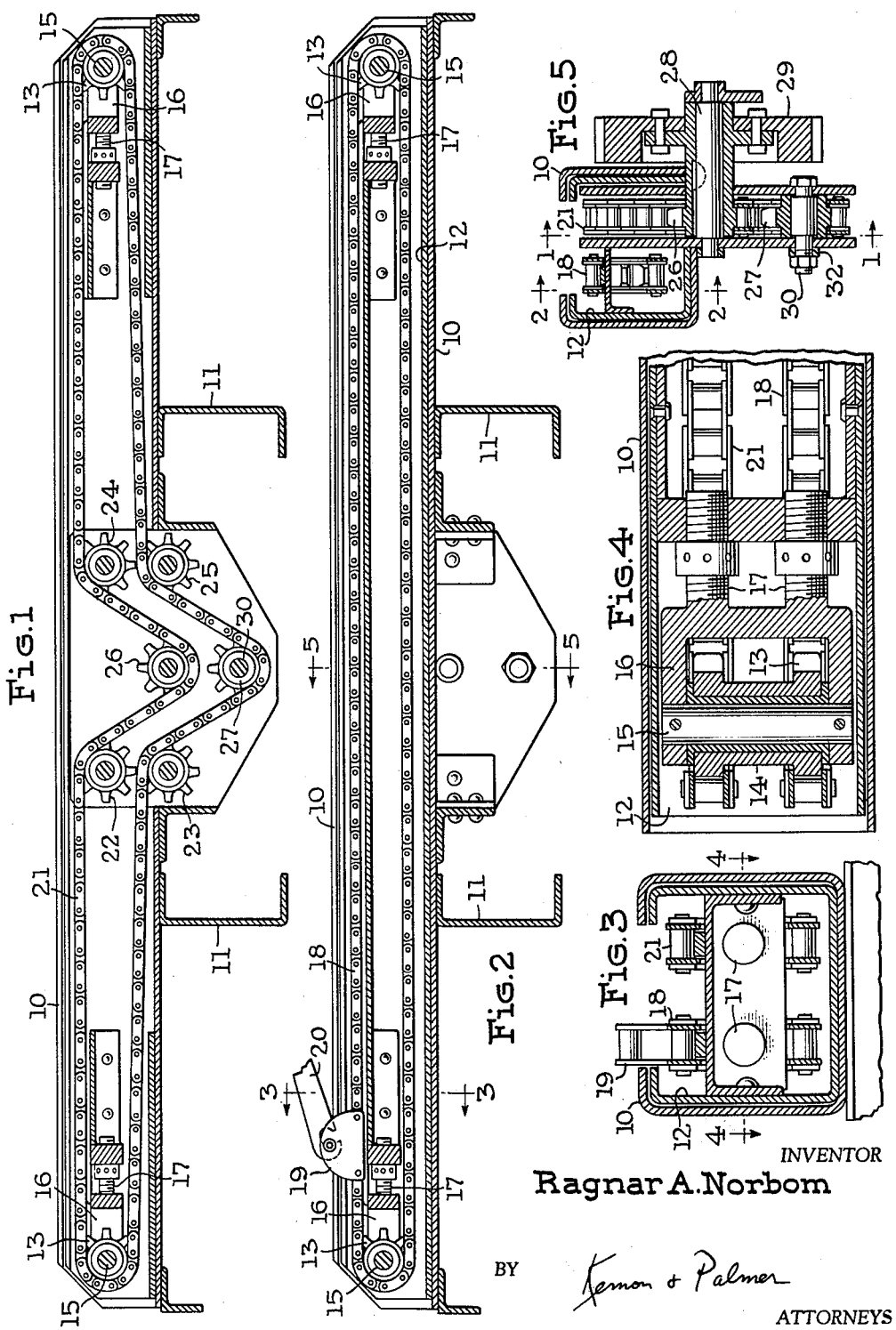
INVENTOR
Ragnar A. Norbom
BY Kenyon & Palmer
ATTORNEYS United States Patent Office 2,922,537
Patented Jan. 26, 1960

2,922,537

DEMOUNTABLE RAILWAY CONTAINER TRANSFER APPARATUS

Ragnar A. Norbom, Alexandria, Va.

Application December 5, 1958, Serial No. 778,353

5 Claims. (Cl. 214—516)

This invention relates to freight containers and more particularly to transfer means for railway freight containers of the demountable type.

Freight containers have come into rather widespread use in recent years and are advantageous because the containers can be loaded on to and unloaded from railway cars to or from tractor trailer vehicles, in order that the freight may be carried on the long hauls by the railroad and delivered on short hauls to a particular addressee by motor freight. The broad idea of this type of freight handling is not new. The present invention constitutes an improvement on the transfer apparatus for the same purpose shown in a prior issued patent, namely, Norbom, 2,834,495 of 1958.

It is the principal object of the present invention to provide a chain transfer apparatus for demountable railway freight containers which is of simplified construction and yet is effective in one continuous cycle of the apparatus to remove a container from a motor vehicle to a railroad car or vice versa.

Other objects and advantages of the present invention will be apparent from the following description taken in conjunction with the attached sheet of drawings in which Figure 1 is a sectional view on the line 1—1 of Figure 5 of a preferred embodiment; Figure 2 is a sectional view similar to Figure 1, taken on the line 2—2 of Figure 5; Figure 3 is a sectional view on lines 3—3 of Figure 2; Figure 4 is a sectional view substantially on the line 4—4 of Figure 3, and Figure 5 is a view in section along the lines 5—5 of Figure 2.

In general, the apparatus of the present invention involves a guide member of substantially open top box-like configuration which is rigidly mounted on the bed of the tractor trailer and extends transversely of the trailer bed. Telescopically received within the guide member is a slide member of substantially identical cross-sectional configuration, so that the slide member is free to reciprocate within fixed limits within the guide. The slide member carries at its opposite ends a pair of double sprocket wheels or pulleys. A first chain is entrained around corresponding sprockets at opposite ends of the slide and carries on its upper flight means for actual engagement with the freight container. A second endless chain entrains around the other corresponding sprockets at opposite ends of the slide, and at its center portions also entrains around a pair of vertically aligned sprockets, one of which is an adjustably braked idler sprocket, and the other of which is positively driven. In view of the fact that the idler sprocket is braked, it is effective to anchor the power chain at that point during movements of the slide between its fixed limits. As soon as the slide reaches either of its limits of travel, however, continued operation of the drive chain will result in rotation of the braked idler sprocket in order to complete movement of the drive member to the extreme outer end of the slide.

Referring now to the drawings, in Figures 1 and 2, guide member 10 is shown rigidly attached in any desirable manner to the uppermost surface of the bed portion of a motorized vehicle. The side sills or scuff rails of the vehicle are shown at 11 in Figures 1 and 2. Telescopically received within the guide member is a slide member 12. Referring now to Figure 3, it will be seen that the guide and slide members are of identical cross-sectional configuration, although the guide 10 is of course of greater dimensions than the slide 12.

At each end of the slide member there is provided a pair of sprocket wheels 13 which preferably have a common hub 14 as shown most clearly in Figure 4. The axle 15 of the sprockets 13 is mounted in a spider-like member 16, and the latter is adjustably mounted on the slide 12 by means of a pair of threaded studs 17, as shown in Figs. 1, 2 and 4. The purpose of this mounting is to provide for tension adjustments in the chain members, to be described hereinafter.

As shown most clearly in Figure 2, a first endless chain 18 entrains around the corresponding sprockets 13 positioned at opposite ends of the slide member 12. On the upper flight of the chain 18 there is provided a drive member or drive link 19 to which may be attached a drive bar 20 shown in Figure 2 for engagement with a portion of the container.

Referring now to Figures 1 and 5, the driven portion of the apparatus is most clearly shown. A second endless drive chain 21 entrains around corresponding sprockets 13 at opposite ends of the slide 12 and the center portions of this chain entrain around a plurality of sprockets positioned substantially in the center of the trailer bed. Of these sprockets, those bearing reference numerals 22–25 inclusive, are merely idlers and serve the purpose of guiding the chain to the power driven sprocket 26 and an adjustably braked sprocket 27. As shown in Figure 5, the shaft 28 to which is keyed the driven sprocket 26, carries at its opposite end a pinion member 29. Power for actuating the entire apparatus therefore is applied from a suitable source such as an electric motor through gearing to the drive pinion 29.

Still referring to Figure 5, the lower idler sprocket 27 is shown mounted on an axle 30 which comprises a stud member having a companion nut on its outer end, and preferably a locking washer of any conventional type indicated by the reference numeral 32. By adjusting the nut on the stud therefore, it is possible to apply a braking force to this pinion. Equivalent means for achieving the same result will be obvious to those skilled in the art, and the stud and nut combination shown here is for illustrative purposes only. It will be appreciated that the braking force must be such as to permit movement of the slide under loaded conditions without rotation of the idler. It must be insufficient, however, to prevent rotation of the same sprocket for continued movement of the drive member and first chain once the slide has reached its limit of travel in either direction.

The operation of the apparatus as thus far described is that with power applied to the driven sprocket 26, the second chain 21 must move. If the idler sprocket 27 were not restrained in some way against rotation, there would be no movement of the slide 12 with respect to the guide because the chain would simply continue to travel around its closed path. By applying a predetermined amount of braking force to the sprocket 27, however, it is effective to anchor the chain at its point of engagement with the sprocket to produce linear movement of the slide 12 within the guide 10. As soon as the slide reaches its extreme limit of movement in either direction, however, continued application of power to the drive chain results in mere running of the chain around its closed circuit. However, this latter action is effective to cause continued movement of the first chain and therefore continued movement of the drive member 19 until it reaches the end of the slide. The various positions of the slide with respect to the guide and the drive member with respect to the slide and guide have not been illustrated in the attached drawings because they are clearly shown in Figures 11, 12 and 13 of the aforementioned Norbom patent. Likewise, the actual freight container mounted on either the railway car or the tractor trailer bed has not been shown and reference to the aforementioned patent will provide an adequate disclosure of these points. Obviously, only one chain transfer means has been shown, but a number of identical units would be employed on each bed in order to insure even movement of the containers from or on to the trailer bed.

While a preferred embodiment of the present invention has been herein shown and described, applicant claims the benefit of a full range of equivalents within the scope of the appended claims.

I claim:

1. Demountable railway freight container transfer apparatus for a vehicle comprising in combination: guide means mounted transversely of the vehicle bed; an elongated slide member mounted for reversible reciprocating movement between fixed limits within said guide means; a pair of chain tightening double pulleys, one positioned at each end of said slide, said pulleys at at least one end being sprocket pulleys; a positively driven sprocket rotatably mounted on the bed of the vehicle substantially at the center thereof; an idler sprocket also rotatably mounted on the bed of the vehicle substantially at the center thereof and in the same plane as said drive sprocket; frictional means for opposing rotation of said idler sprocket; an endless drive chain entrained around said chain tightening pulleys, said driven sprocket and said idler sprocket; a container engaging member mounted for movement from either end of said slide to the opposite end thereof; and an endless driven chain entrained around said chain tightening pulleys and carrying said drive member on its upper flight, whereby said frictional means is operative to anchor said driven chain during compound movement of said slide and said container engaging member and inoperative to prevent complete movement of said engaging member from one end of said slide to the opposite end thereof.

2. The combination defined by claim 1 in which said positively driven sprocket engages the upper flight of said drive chain and said idler sprocket engages the lower flight thereof, both of said sprockets being mounted in vertical alignment below said slide member.

3. The combination defined by claim 1 in which said slide member is telescopically received within said guide means, both said member and said means being of opened top C-shaped cross section, said slide member further including means for guidingly supporting the upper flights of said endless chains.

4. Demountable railway freight container transfer apparatus for a vehicle comprising in combination: guide means mounted transversely of the vehicle bed; an elongated slide member mounted for reciprocating movement between fixed limits within said guide means; means for reciprocating said slide including: a positively driven rotatable sprocket journaled on the vehicle bed substantially at the center thereof; an idler sprocket frictionally biased against rotation, said idler sprocket being mounted on the vehicle bed substantially at the center thereof; a first pair of slide mounted sprockets positioned adjacent each end of said slide, and an endless drive chain entrained about said slide mounted sprockets and drivingly engaging said driven sprocket and said idler sprocket; a second pair of slide mounted sprockets rotatable coaxially with said first pair of slide mounted sprockets and positively driven thereby; a driven chain entrained around said second pair of slide mounted sprockets; and means on said driven chain for engaging and moving the container relative to and in the same direction of movement as said slide member; said frictionally biased idler sprocket being operative to anchor one flight of said drive chain during movement of said slide member and rotatable over its frictional bias after said slide member has moved to one of its fixed limits to permit movement of said last mentioned means completely across said slide member.

5. Demountable railway freight container transfer apparatus for a vehicle comprising in combination: a guide member of open top box-like cross section mounted transversely of the vehicle bed; a slide member of similar cross section, slidably received within said guide member; a pair of double pulleys, one mounted at either end of said slide, at least one of said double pulleys comprising sprocket wheels; a first endless chain entrained around said pulleys; a drive member mounted on the upper flight of said first chain; for engaging the container; a positively driven sprocket mounted substantially in the center of the vehicle bed and on an axis below the flights of said first endless chain; an idler sprocket also mounted substantially at the center of the vehicle bed, in the same plane with said driven sprocket; means for adjustably braking said idler sprocket; and a second endless chain entrained around said pulleys and said driven and idler sprockets.

No references cited.